3,413,094
METHOD OF DECREASING THE METALLIC IMPURITIES OF FIBROUS CARBON PRODUCTS
David W. Gibson, Salem, W. Va., assignor to HITCO, Gardena, Calif.
No Drawing. Filed Jan. 24, 1966, Ser. No. 522,386
9 Claims. (Cl. 23—209.9)

ABSTRACT OF THE DISCLOSURE

The metallic content and particularly the sodium content of essentially amorphous fibrous carbon products is reduced by treating the products with an aqueous solution of hydrobromic acid or hydriodic acid and thereafter firing the treated products at a temperature sufficient to remove substantial metallic impurities but below a temperature sufficient to substantially increase thermal conductivity and crystallinity of the fibrous carbon product.

---

The present invention generally relates to improved fibrous carbon products and more particularly relates to a method of providing essentially amorphous fibrous carbon products having reduced concentrations of metallic impurities, particularly sodium.

There is an increasing demand for fibrous carbon materials, both in the defense industry and for commercial purposes. In many instances, particularly for defense purposes, fibrous carbon materials are utilized as ablative resistant materials and are required to have certain characteristics, including low concentrations of metallic impurities. Moreover, fibrous carbon materials in many instances are further required to have as low a thermal conductivity as possible.

It is known that in order to keep the thermal conductivity low the amorphous nature of the carbon should be preserved as much as possible, i.e. crystallization of the carbon (graphitizing) should be suppressed. Thus, amorphous carbon has a lower heat conductivity than crystalline or graphitic carbon. Moreover, amorphous carbon fiber may also have higher tensile strength than graphitic carbon fiber. As a practical matter, so-called carbon fibers are usually slightly crystalline, and so-called graphite fibers are usually substantially amorphous. In any event, for certain purposes, suppression of carbon crystallinity is desired. Hereinafter, by amorphous carbon is meant carbon which is at least essentially amorphous and has not been subjected to temperatures of, for example, 2200° F. and above for periods of times sufficient to substantially increase the thermal conductivity thereof.

In the past, many attempts have been made to purify carbon products by removing alkali metals therefrom, either before, during or after carbonization. Most of such attempts have been limited to the treatment of monolithic forms of carbon with various so-called "getters" in gaseous form at very high temperatures of the order of about 4000° F.–5000° F. The effect of such getters as chlorine gas or the like is to react with the sodium or other metal in the carbon to form a salt which is removed by volatilization at the reaction temperature.

Another standard method has been to volatilize the metallic contaminants from the carbon at even higher temperatures and sweep them away by a purge gas. Such a procedure increases the thermal conductivity and crystallinity of the carbon, is time consuming and usually expensive. Moreover, in many instances it is substantially ineffective, diffusion of the metallic contaminants tending to occur relatively slowly, especially in thick carbon specimens. Moreover, carbides may be formed before the metallic contaminants can be removed, especially at such high temperatures.

Another major disadvantage in carrying out purification in accordance with the indicated conventional procedures has been that the essentially amorphous carbon being treated is partially or substantially converted at the treating temperature to crystalline carbon (graphite) having different physical characteristics, notably, a substantially increased thermal conductivity. Rapid increases in thermal conductivity, and also electrical conductivity can be observed in fibrous carbon products during exposure to about 2200° F. and above. Moreover, temperatures of 4000–5000° F. cause rapid and irreversible changes in the structure of the carbon.

Accordingly, a simple, effective and inexpensive method has been sought for substantially removing metal contaminants, especially alkali metal impurities, such as sodium, from fibrous amorphous carbon products in a manner which preserves the low thermal and electrical conductivity, while preventing substantial conversion of the amorphous carbon to crystalline form.

Accordingly, it is a principal object of the present invention to provide an improved method of preparing fibrous amorphous carbon products having reduced metal content, specifically alkali metal content, such as sodium, together with low thermal and electrical conductivities and high tensile strength and flexibility.

It is also an object of the present invention to purify existing carbon fiber products exhibiting low thermal and electrical conductivity.

It is a further object of the present invention to provide a simple, effective, and rapid method of substantially removing alkali metal impurities from carbon fiber without substantially changing the thermal and electrical conductivity of the fiber, and the tensile strength and flexibility thereof.

It is yet another object of the present invention to provide improved carbon fiber products having reduced sodium content and low thermal conductivity and electrical conductivity, the structure of said fiber products being substantially completely retained in unchanged form.

The foregoing and other objects are accomplished by the present method which results in the preparation of an improved carbon fiber product. The carbon fiber product has a reduced alkali metal content, particularly sodium content, and low thermal conductivity and electrical conductivity. The carbon fiber is substantially completely retained in the original essentially amorphous state during removal of the indicated metal contaminants, so that flexibility and tensile strength remain essentially unchanged. The method is simple, rapid, and effective and is capable of being accomplished at low temperature, yet removes substantial quantities of alkali metals uniformly from all portions of the fiber, in contrast to surface and near-surface treatments previously employed.

More particularly, the present method involves reducing the alkali metal content of amorphous carbonized cellulosic fiber by intimately contacting the fiber with an agent selected from the group consisting of hydrobromic acid and hydriodic acid, and mixtures thereof, as by impregnating the fiber with aqueous solutions of the same. Thereafter, the fiber is removed from contact with the solution bath, and is dried and fired in an inert gas at a temperature sufficient to remove alkali metal impurities in the form of volatile bromides and/or iodides, but below a temperature sufficient to substantially increase the thermal conductivity and electrical conductivity of the fiber, and the crystallinity of the carbonaceous fiber.

As a specific example, an essentially amorphous carbon fiber sample was prepared by carbonizing washed rayon cloth at temperatures from about 350° to about 1000° F. in helium in increments of about 50° F. with holding times at each increment of about two hours.

Before firing the carbonized fiber sample at about 1900° F., the sample was immersed in an aqueous solution containing about 1%, by weight, of hydrobromic acid. Intimate contact between the fibers and solution was assured by agitating the solution ultrasonically during immersion. The contact time was five minutes, after which the sample is withdrawn from the solution dried in air at about 250° F., and then fired at 1900° F. for five minutes, utilizing a nitrogen purge stream to strip off volatized metallic contaminants released from the carbon. This treatment reduced the total alkali metal content of the fiber sample over 70 percent, by weight. Moreover, the sodium content of the sample was reduced from about 2800 parts per million to 135 parts per million. Initially low levels of potassium, calcium, magnesium and lithium in the sample were maintained or further reduced so that the sample after final treatment had very low levels of sodium, potassium, calcium, magnesium, and lithium. Moreover, the thermal conductivity of the finished carbon cloth sample was essentially the same as a control given the same carbonizing and firing but no metallic purification treatment. The tensile strength and flexibility of the control and test sample were identical. Both the control and test sample were found to be esentially amorphous carbon in nature.

A second test sample of rayon cloth treated in an identical manner, except for the substitution of hydriodic acid in place of hydrobromic, produced results comparable to the first test sample in terms of low sodium content and other characteristics of the carbon cloth product. In a third parallel test, however, when HCl (1%, by weight) was substituted for HBr, the sodium content was about five times greater than that of the sample treated with the hydrobromic acid solution. It was only when the firing temperature was increased to +2200° F. and maintained for a substantial time, e.g. one-half hour or more, that the sodium content dropped to a level comparable to the HBr and HI treated samples. Accordingly, the HCl treated sample was substantially inferior to and unsuitable in comparison with the HI and HBr treatment. Further objects and advantages of the present invention will be apparent from a study of the following detailed description.

According to the present method, a fibrous carbon material, prepared by any conventional method of carbonizing and containing sodium, is treated to reduce the sodium content thereof. In this regard, the fibrous carbonized material is treated with an agent selected from the group consisting of hydriodic acid, hydrobromic acid and mixtures thereof in aqueous solution, for a time sufficient to substantially completely penetrate and impregnate the fibrous carbon material. Reaction between the agent and the metal, such as sodium in the carbon fiber, to form thereafter volatile bromides and/or iodides, may also be instituted. Thereafter, the sample is dried and then is fired at below a temperature which substantially increases the thermal conductivity and electrical conductivity of the sample, but which is above a temperature sufficient to effect the desired reaction between the selected agent and the metal to form volatile bromides and/or iodides and to volatilize the selected bromides and/or iodides of other metals in the carbon fiber product at a satisfactory rate, whereby the sodium and other metal content of the carbon fiber product is substantially reduced.

The carbon fiber material is one prepared from cotton, rayon, or the like cellulosic material, which is preferably substantially free of impurities before carbonization.

The carbonization referred to can have been carried out over any suitable period of time, rate and temperature range sufficient to substantially completely carbonize the cellulosic material to essentially amorphous carbon fiber, while substantially retaining the fiber integrity. Such product has relatively high tensile strength and flexibility, low thermal conductivity, and low electrical conductivity.

Normally, the product will have a sodium concentration of more than 1000 parts per million, and normally it is desired, for most specialized uses calling for a low sodium content, to reduce that sodium concentration to substantially below 500 parts per million while substantially retaining the amorphous nature of the material, tensile strength and flexibility, as well as low thermal and electrical conductivity.

In accordance with the present method, the fibrous carbon material, either before or after an optional firing step at, for example, about 1500° F. to about 2100° F. in an inert gas, to volatilize hydrocarbons and heat shrink the same, is contacted with hydriodic acid, hydrobromic acid, or a mixture thereof, in aqueous solution, which acid combines with the sodium of the fiber to form sodium bromide and/or sodium iodide capable of being removed from the fiber in large amounts at below about 2000° F. The contacting can be effected by spraying, etc., but preferably is achieved by immersing the sample in the medium. The acid is utilized in any suitable concentration, for example, about 0.5 to 5 percent, by weight, preferably about 1–2 percent, by weight, for a suitable contact time, for example, about 1–5 minutes. Preferably, contacting is facilitated by agitating the solution and sample ultrasonically, as by a conventional ultrasonic agitator.

Thereafter, the sample is removed from the solution, dried and fired in an inert gas, such as argon, krypton, xenon or helium, or in a vacuum at above a temperature sufficient to assure substantially rapid vaporization of the salts desired to be removed from the carbon fiber product. Although the boiling point of sodium bromide is 1390° C. or 2534° F. and that of sodium iodide is 1300° C. or 2372° F., it is not necessary to fire the carbon fiber product to above the indicated boiling points to remove the indicated salts therefrom. Instead, firing is maintained below about 2200° F., i.e. below that temperature at which the thermal conductivity of the carbon fiber begins to sharply increase due to conversion of the carbon from the amorphous to the crystalline form. However, firing is carried out in an inert gas, such as nitrogen, argon, helium, krypton or xenon, at a temperature sufficient to permit substantially rapid vaporization of the sodium bromide and/or sodium iodide from the carbon fiber. This temperature has been found to be at least about 1500° F. and not more than about 2100° F., preferably about 1700° F.–1900° F., and more preferably about 1800° F. for a suitable length of time, for example about 1–20 minutes, preferably about 5–10 minutes. The carbon fiber product is thereby greatly reduced in sodium content and is provided in a finished, devolatilized condition. The potassium, lithium, calcium and magnesium concentrations thereof are also reduced.

The following examples further illustrate certain features of the present invention.

EXAMPLE I

Two samples of carbon fiber cloth, previously fired at about 2000° F., and derived from rayon fiber cloth by incremental heating, and containing more than 96 percent, by weight, of carbon, essentially in amorphous form, were treated to reduce the sodium content thereof. In this regard, the samples were immersed in acid solutions set forth in Table I below, and ultrasonically washed for 5 minutes, then removed from the solutions, drained, dried at about 200° F. and then fired in helium at 1500° F. for 5 minutes. After cooling to ambient temperature, the samples were tested for metal content. The results are set forth in Table I.

TABLE I

| Sample | Treatment description | Na (p.p.m.) |
|---|---|---|
| 1 | Control | 3,800 |
| 2 | 1% HI | 250 |
| 3 | 1% HBr | 135 |

Table I clearly shows that the HBr treated sample exhibited a large decrease in sodium content, as did the HI, when compared with the control. Moreover, Samples 2 and 3 were tested and found to be of high quality and comparable in flexibility, tensile strength, thermal conductivity and electrical conductivity with the control, Sample 1.

EXAMPLE II

A series of samples of carbon cloth prepared as set forth in Example I were treated in accordance with the procedure of Example I, except firing was carried out at 2000° F. for 5 minutes after impregnation of the samples with either 1 percent or 5 percent HBr or HI aqueous solutions.

The 1% and 5% solutions of HBr and HI produced comparable results. In each instance, they resulted in large reductions in the calcium and magnesium content of the samples. The samples tested and controls run therewith were substantially identical in tensile strength, flexibility, appearance and thermal conductivity.

Further tests were conducted in accordance with the procedure of Example I and utilizing carbon cloth prepared in the manner described in Example I, but employing the parameters set forth in Table II below:

stances to almost negligible levels. In most instances, the potassium, calcium, and magnesium concentrations were also reduced, while the lithium content was maintained at a very low level. Moreover, the resistivity or electrical conductivity (in ohms/in.$^2$) remained very low and at about the level of the control. The electrical conductivity of carbon is directly proportional to the thermal conductivity. Accordingly, low thermal conductivity is desired. In addition, the tensile strength and flexibility of the control and test samples were about the same. All treated samples were of uniformly high quality.

EXAMPLE III

In a further series of tests carried out generally in accordance with the procedure of Example I, on rolls of carbon cloth, and utilizing 1% HBr aqueous solution, in which the samples were immersed for 5 minutes and subjected to ultrasonic vibration therein, firing of the impregnated samples was effected at 1800° F. for 5 minutes. Samples were taken from the rolls and tested for metal content before the acid bath treatment, after the acid bath treatment and after firing to determine whether the aqueous acid bath itself, apart from the firing operation, had

TABLE II

| Sample | Treatment description | Firing Temp. (° F.) | Impurities (p.p.m.) | | | | | Resistance, ohms/in.$^2$ |
|---|---|---|---|---|---|---|---|---|
| | | | Na | K | Ca | Mg | Li | |
| 1 | Control | | 1,050 | 24 | 34 | 36 | <1 | 0.61 |
| 2 | HBr | 1,700 | 275 | 16 | 12 | 36 | <1 | .60 |
| 3 | HBr | 1,890 | 4 | 6 | 1 | 5 | <1 | .64 |
| 4 | HI | 1,800 | 13 | 2 | 1 | 22 | <1 | .64 |
| 5 | HBr | 2,000 | 21 | 11 | 10 | 36 | <1 | .60 |

Table II shows that HBr and HI sharply reduced the sodium content of the carbon cloth samples, in some instances any effect on reduction of the metal impurity concentration. The results are set forth in Table III below.

TABLE III

| | Roll 1 | | | Roll 2 | | |
|---|---|---|---|---|---|---|
| | Before acid bath | Before firing | After firing | Before acid bath | Before firing | After firing |
| Sodium (p.p.m.) | 872 | 598 | 29 | 770 | 590 | 24 |
| Potassium (p.p.m.) | 25 | 20 | 7 | 25 | 22 | 7 |
| Calcium (p.p.m.) | 59 | 40 | 38 | 45 | 48 | 41 |
| Magnesium (p.p.m.) | 42 | 33 | 38 | 41 | 32 | 38 |
| Lithium (p.p.m.) | <1 | <1 | <1 | <1 | <1 | <1 |
| Avg. total alkalinity (p.p.m.) | 999 | 692 | 113 | 882 | 693 | 111 |
| Max. total alkalinity (p.p.m.) (highest individual sample) | 1,028 | 691 | 121 | 900 | 697 | 113 |
| | Roll 3 | | | Roll 4 | | |
| Sodium (p.p.m.) | 793 | 570 | 25 | 673 | 520 | 23 |
| Potassium (p.p.m.) | 30 | 22 | 6 | 21 | 22 | 7 |
| Calcium (p.p.m.) | 57 | 39 | 37 | 42 | 37 | 31 |
| Magnesium (p.p.m.) | 43 | 33 | 41 | 39 | 33 | 38 |
| Lithium (p.p.m.) | <1 | <1 | <1 | <1 | <1 | <1 |
| Avg. total alkalinity (p.p.m.) | 924 | 665 | 110 | 776 | 613 | 100 |
| Max. total alkalinity (p.p.m.) (highest individual sample) | 934 | 676 | 115 | 881 | 626 | 100 |
| | Roll 5 | | | Roll 6 | | |
| Sodium (p.p.m.) | 845 | 580 | 27 | 1,018 | 610 | 29 |
| Potassium (p.p.m.) | 23 | 21 | 6 | 27 | 21 | 7 |
| Calcium (p.p.m.) | 61 | 41 | 47 | 52 | 48 | 39 |
| Magnesium (p.p.m.) | 41 | 39 | 33 | 43 | 43 | 38 |
| Lithium (p.p.m.) | <1 | <1 | <1 | <1 | <1 | <1 |
| Avg. total alkalintiy (p.p.m.) | 971 | 682 | 114 | 141 | 723 | 114 |
| Max. total alkalinity (p.p.m.) (highest individual sample) | 1,068 | 748 | 119 | 1,186 | 795 | 132 |
| | Roll 7 | | |
| | Before acid bath | Before firing | After firing |
| Sodium (p.p.m.) | 1,143 | 640 | 37 |
| Potassium (p.p.m.) | 25 | 14 | 7 |
| Calcium (p.p.m.) | 58 | 29 | 33 |
| Magnesium (p.p.m.) | 47 | 31 | 41 |
| Lithium (p.p.m.) | <1 | <1 | <1 |
| Avg. total aklalinity (p.p.m.) | 1,274 | 715 | 108 |
| Max. total alkalinity (p.p.m.) (highest individual sample) | 1,357 | 768 | 108 |

Table III above shows that the HBr treatment, even before firing, resulted in a reduction in the sodium content of the carbon cloth, apparently by extraction, and that further large reductions in sodium content were affected by the firing operation after the HBr bath treatment. In most instances, reductions in potassium, calcium and magnesium occurred along with the reduction in sodium, so as to provide a final product having a total alkalinity of less than about 150 p.p.m., in contrast to starting materials having total alkalinity about 5 to 10 times as high. Accordingly, purified carbon fiber products were readily, simply and inexpensively produced.

Accordingly, a method is provided whereby the sodium content of carbon fiber products can be simply, rapidly, inexpensively and efficiently reduced to low levels, while substantially preserving the tensile strength, flexibility and low thermal and electrical conductivity of the carbon fiber product. The method is also effective in removing other metals, such as calcium and magnesium, lithium and potassium, from the carbon fiber. The method may involve some extraction of the metals, which is followed by extensive volatilization of bromides and/or iodides of the metals upon suitable heating to firing temperatures in the presence of inert gas, preferably a purge stream. Further advantages of the invention are as set forth in the foregoing.

Various modifications, changes, alterations, additions and substitutions can be made in the present method, its steps, and in the parameters for carrying out the present method. All such modifications, changes, alterations, additions and substitutions as are within the scope of the appended claims form a part of the present invention.

What is claimed is:

1. A method of decreasing the metallic content of fibrous carbon products, which method comprises contacting an essentially amorphous fibrous carbon product containing sodium with an aqueous solution of an agent selected from the group consisting of hydrobromic acid, hydriodic acid and mixtures thereof, and thereafter firing the acid-contacted fibrous carbon product for a time and at a temperature above that necessary to remove substantial sodium impurities from said fibrous carbon product but below a temperature sufficient to substantially increase thermal conductivity and crystallinity of said fibrous carbon product.

2. The method of claim 1 wherein said agent comprises hydrobromic acid.

3. The method of claim 1 wherein said agent comprises hydriodic acid.

4. The method of claim 1 wherein said firing temperature is between about 1500° F. and about 2100° F.

5. The method of claim 4 wherein said firing temperature is about 1700° F. to 1900° F.

6. The method of claim 5 wherein said firing temperature is about 1800° F.

7. The method of claim 1 wherein said contacting is effected by immersing said fibrous carbon product in said aqueous solution for about 1–5 minutes, wherein said solution has a concentration of about 1–5%, by weight, of said agent, wherein said solution is ultrasonically agitated during said immersion, wherein said contacted fibrous carbon product is then removed from said aqueous solution and dried at below about 300° F. before said firing, and wherein said firing is effected at about 1800° F. for about 1–20 minutes in an inert gas, whereby a purified fibrous carbon product is obtained.

8. The method of claim 7 wherein said inert gas is nitrogen utilized as a purge stream, wherein said agent is hydrobromic acid in about 1 percent, by weight, concentration in said aqueous solution, and wherein said firing is carried out for about 5 minutes.

9. The method of claim 7 wherein said inert gas is nitrogen utilized as a purge stream, wherein said agent is hydriodic acid in about 1 percent, by weight, concentration in said aqueous solution, and wherein said firing is carried out for about 5 minutes.

References Cited
UNITED STATES PATENTS

| | | | |
|---|---|---|---|
| 2,149,671 | 3/1939 | Heinrich et al. | 23—209.9 |
| 2,657,118 | 10/1953 | Phillips et al. | 23—209.9 |
| 2,698,777 | 1/1955 | Hartwick et al. | 23—209.9 |

EDWARD J. MEROS, *Primary Examiner.*